US 8,663,810 B2

(12) United States Patent
Ambroise et al.

(10) Patent No.: US 8,663,810 B2
(45) Date of Patent: Mar. 4, 2014

(54) MULTILAYER SHRINK FILMS, LABELS MADE THEREFROM AND USE THEREOF

(75) Inventors: Benoit Ambroise, Hachy (BE); Pang-Chai Lu, Pittsford, NY (US)

(73) Assignee: Jindal Films Americas LLC

( * ) Notice: Subject to any disclaimer, the term of this patent is extended or adjusted under 35 U.S.C. 154(b) by 206 days.

(21) Appl. No.: 13/120,866

(22) PCT Filed: Sep. 22, 2009

(86) PCT No.: PCT/US2009/057762
§ 371 (c)(1),
(2), (4) Date: May 2, 2011

(87) PCT Pub. No.: WO2010/047906
PCT Pub. Date: Apr. 29, 2010

(65) Prior Publication Data
US 2011/0268979 A1   Nov. 3, 2011

Related U.S. Application Data

(60) Provisional application No. 61/108,334, filed on Oct. 24, 2008.

(51) Int. Cl.
*B32B 27/08* (2006.01)

(52) U.S. Cl.
USPC .......................................................... 428/515

(58) Field of Classification Search
None
See application file for complete search history.

(56) References Cited

U.S. PATENT DOCUMENTS

2002/0192412 A1 * 12/2002 Satani et al. ................. 428/35.7
2005/0214557 A1    9/2005 Arthurs et al.

FOREIGN PATENT DOCUMENTS

| EP | 1 632 343 | 3/2003 |
|---|---|---|
| EP | 1 300 238 | 4/2003 |
| JP | 2000-159946 | 6/2000 |
| JP | 2000-202951 | 7/2000 |
| JP | 2005-047182 | 2/2005 |
| WO | WO 2004/018198 | 3/2004 |
| WO | WO 2005/097493 | 10/2005 |
| WO | WO 2006/071826 | 7/2006 |

* cited by examiner

*Primary Examiner* — Sheeba Ahmed

(57) ABSTRACT

A multilayer heat shrink film including a core layer including one or more alpha-olefin polymer and at least one skin layer including one or more cyclic olefin copolymers (COC), process for its preparation and uses thereof.

15 Claims, No Drawings

MULTILAYER SHRINK FILMS, LABELS MADE THEREFROM AND USE THEREOF

CROSS-REFERENCE TO RELATED APPLICATIONS

This application is a National Stage Application of International Application No. PCT/US2009/057762 filed Sep. 22, 2009, which claims priority from U.S. Provisional Application Ser. No. 61/108,334, filed Oct. 24, 2008, the contents of which are incorporated by reference in their entirety.

FIELD OF INVENTION

The present disclosure relates to multilayer shrink films comprising at least one core layer comprising an alpha-olefin polymer and at least one skin layer comprising a cyclic olefin polymer. More specifically the disclosure relates to labels made from these films, in particular sleeve labels, and to the use of such films and labels in packaging.

BACKGROUND OF THE INVENTION

Shrink labels represent a high proportion of labelling applications. High shrink labels are the fastest growing segment in the labelling business due to the trend toward using contoured containers and shrink sleeve labels with 360° graphics for high customer appeal.

Application of heat to a shrink label around a contour container causes the label to shrink preferentially in the direction extending circumferentially around the container to conform to the outside container shape.

Shrink labels fall into two categories: roll-on-shrink-on (ROSO) labels and sleeve labels. ROSO labels are supplied from a reel, cut into sheets, applied around a container and seamed around the container during the labelling step using hot melt to form a seam, with the machine direction (MD) of the film extending circumferentially around the container. ROSO label films primarily shrink in the MD direction and generally employ biaxially oriented polypropylene (BOPP) films.

In contrast sleeve labels are solvent seamed into a tube and supplied from that tube placed around a container, with the transverse direction (TD) of the film extending circumferentially around the container. Application of heat causes the label to shrink preferably in the direction extending circumferentially around the container and to conform to the container. Sleeve labels primarily shrink in the TD direction.

Current high shrink sleeve labels are sleeves made of a TD shrink film that is solvent seamed into a folded tube. These high shrink labels provide more than 60% shrinkage and are usually made of polyvinyl chloride (PVC), polyethylene terephthalate (PET), polyethylene terephthalate glycol (PETG), polylactic acid (PLA) or oriented polystyrene (OPS). PVC and PET labels are not easily separated from PET bottle flakes using the flotation technique in the recycling process as the films have a density higher than 1 kg/dm$^3$. OPS film requires transportation and storage under controlled conditions due to high natural shrinkage phenomenon occurring gradually at a storage temperature in a warehouse. Natural shrinkage causes deformation problems in a roll form.

While ROSO labels offer a cost advantage, the sleeve labels enjoy an advantage in the extent of shrink percentage that can be obtained. Sleeve labels typically shrink up to 60-70% around the circumference of the container whereas commercial ROSO films shrink only up to 20%.

Currently, no "all polyolefin" shrink films are known to be solvent seamed to form a tube, due to the inability of solvent to swell semi-crystalline materials. Solvent sealable material like polystyrene (PS) or PET may be coextruded on the polyolefin based film, but it will require an expensive tie layer to bond the solvent sealable skin on the polyolefin core layer. Such combination of a solvent sealable skin on a polyolefin core layer using an adhesive tie layer has other disadvantages like the development of haze on film after shrinkage or poor optics when the film is recycled.

It is therefore desirable to identify a polyolefin based film suitable for sleeve labelling that can be seamed on the current available solvent seamed machines and shrink around a container to at least 50%, has low natural shrinkage and can be easily separated from PET flakes for recycling. Shrinkage in a steam tunnel for high heat efficiency would be preferred.

WO2006/071826 discloses multilayer heat shrink film having a core layer comprising a blend of (i) at least one polyterpene and (ii) a syndiotactic polypropylene or a cyclic olefin copolymer (COC) and skin layers comprising one or more polyolefins having an ultimate shrinkage of at least 25% at 135° C. These films suffer from low stability and stiffness.

EP 1632343 discloses a multilayer heat shrinkable film composed of at least three layers comprising skin layers made of resin composition comprising 55 to 95% by mass of cyclic olefin based resin and from 45 to 5% by mass of a linear low-density polyethylene and an intermediate layer composed of a resin composition comprising 95 to 55% by mass of propylene-α-olefin random copolymer and from 5 to 45% by mass of the cyclic olefin based resin. The density and cost of such films are high.

It has now been discovered that combining a polyolefin core layer with one or two skin layers composed of solvent sealable or swellable polymer such as cyclic olefin copolymer (COC) provides a film that can be used for shrink sleeve labelling with up to about 70% shrink at temperature compatible with steam tunnel. The COC is solvent sealable using the standard solvent used in sleeve labelling. The films and/or labels made from the films have high stiffness for good dispensing. Their low natural shrinkage provides good storage stability and usually avoids transportation and storage under controlled conditions. Finally the multilayer films according to the disclosure are particularly suitable to produce labels that are easily separated from the PET containers.

SUMMARY OF THE INVENTION

Accordingly, in some embodiments, the present disclosure relates to a multilayer heat shrink film comprising a core layer comprising one or more alpha-olefin polymers and at least one skin layer comprising one or more cyclic olefin polymers or amorphous polyesters or polylactic acids.

In other embodiments, the film is a three layers film comprising one core layer and two skin layers.

The film may also be a five layers films comprising one core layer, two skin layers on each side of the core layer and a tie layer between the core layer and each skin layer.

DETAILED DESCRIPTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, "polymer" may be used to refer to homopolymers, copolymers, interpolymers, terpolymers, etc.

As used herein, the term "COC" means random copolymers of ethylene or propylene and cyclic olefin. Examples of cyclic olefins are norbornene and/or its derivatives, and/or tetracyclododecene and/or its derivatives.

Core Layers

As described above, the core layer comprises one or more alpha-olefin polymers. The alpha-olefins polymers used for the core layer preferably have melting points as determined by differential scanning calorimeter (DSC) in the range of from 60° C. to 125° C., more preferably from 60° C. to 100° C. Propylene and ethylene homopolymers and copolymers and combination thereof are usually used for forming the core layer of the films according to the disclosure. Core layers include propylene based elastomers, ethylene based plastomers, metallocene catalysed linear low density polyethylenes as defined hereafter and combinations thereof provide good results.

Propylene-Based Elastomers

Propylene-based elastomers have a heat of fusion (Hf) less than or equal to 75 J/g and a triad tacticity of three propylene units, as measured by $^{13}$C NMR, of 75% or greater, or even 90% or greater. The lowered Hf may result from stereo- or regio errors and/or from the incorporation of one or more units derived from a comonomer of a $C_2$ or $C_4$-$C_{20}$ alpha-olefin and optionally diene-derived units. Such propylene-alpha-olefin elastomers can comprise between 6 to 25 wt. % alpha-olefin and more preferably more than 7 wt. % alpha-olefin. Polypropylene-based elastomers comprising from 8 to 12 wt. % ethylene are particularly suitable.

Triad tacticity is determined according to the method as disclosed in US-A-20040236042. The propylene-alpha-olefin elastomers may have a Hf which is greater than or equal to 0.5 J/g and preferably less than or equal to about 50 J/g. The Hf is determined using ASTM E-794-95 (version E-794-01). Preferred propylene-alpha olefin elastomers have a Mooney viscosity [ML (1+4)@ 125° C.], determined according to ASTM D1646, of less than 100, preferably less than 60 or less than 30 MU. The molecular wt. distribution index (Mw/Mn) of the propylene-alpha olefin elastomers may be from 1.8 to 3 as determined by Gel Permeation Chromatography (GPC). Propylene-based elastomers may be produced by different types of single site catalysts such as bridged metallocenes (see WO199907788), pyridine amines (see WO03/040201) and unbridged metallocenes (see U.S. Pat. No. 5,969,070), preferably in a solution process. Propylene-based elastomers that may be useful in accordance with this disclosure are commercially available from ExxonMobil Chemical Company under the trade name of Vistamaxx™. Some of these materials are further available from the Dow Chemical Company under the trade name Versify™.

Ethylene Based Plastomers

Ethylene based plastomers are very low density linear polyethylenes (VLDPE) having a density between 0.85 g/cm$^3$ to 0.91 g/cm$^3$ determined according to ASTM D1505. Ethylene-based plastomers contain a sufficient quantity of units derived from a $C_3$ to $C_{10}$ comonomer, preferably $C_4$ to $C_8$ alpha-olefins to, among other things, achieve required density. Ethylene-based plastomers are preferably produced in solution or under high pressure conditions using single site catalysts such as biscyclopentadienyl or monocyclopentadienyl metallocenes.

Such plastomers are commercialized by ExxonMobil under the trade name of Exact™, by Dow under the trade name of Affinity™ and by Mitsui under the trade name of Tafiner™.

Metallocene Catalysed Linear Low Density Polyethylenes

In LLDPE, Metallocene linear low density polyethylenes (LLDPE's) have a density of from 0.91 g/cm$^3$ to 0.94 g/cm$^3$ determined according to ASTM D1505. They may be produced in solution, slurry or gas phase conditions using a single site catalyst, such as a metallocene activated by methods well known for such components, for example with aluminoxane or a non-coordinating anion. Low melt index ratio linear polyethylene polymer is a linear polyethylene with a shear sensitivity expressed as melt index ratio $I_{21.6}/I_{2.16}$ ratio (MIR) of less than 30 as determined by ASTM-1238 (2.16 kg and 21.6 kg at 190° C.). The low MIR indicates no or a low level of long chain branches as well as a narrow molecular wt. distribution. High MIR linear polyethylenes include LLDPE's with an MIR of more than 30 which in combination with a relatively low Mw/Mn value is generally accepted to be indicative of the presence of long chain branching. These polymers may be referred to as "homogeneously branched linear polyethylenes". The branches are believed to be linear in structure and may be present at a level where no peaks can be specifically attributed to such long chain branches in the $^{13}$C NMR spectrum.

Metallocene LLDPE's are commercialized by ExxonMobil Chemical Company under the trade name of Exceed™ and Enable™ and by Dow Chemical Company under the trade name of Elite™.

Core layers including propylene-based elastomers such as Vistamaxx™, metallocene linear low density polyethylene such as Exceed™, ethylene based plastomer such as Exact™, or blend thereof provide improved properties like gradual shrink curve and low shrink initiation temperature.

In some embodiments, the core layer consists essentially of alpha-olefin polymer(s). In other embodiments, the core layer comprises polymer blend(s) of alpha-olefin polymer with other polymers, preferably with different alpha-olefin polymer(s).

Polymer blends containing (i) from 50 to 98 wt. % of at least one polymer selected from of propylene based elastomers, ethylene plastomers, metallocene catalysed linear low density polyethylenes or blend thereof and (ii) from 50 to 2 wt. % of at least one other alpha-olefin polymer polymers having a higher melting point and more preferably a higher Hf generally provide films that can be easily oriented on a tenter frame with uniform film flatness and web integrity.

In a preferred embodiment the core layer contains from 5 to 20 wt. % of low density polyethylene (LDPE). According to the present description, LDPE have a density range of 0.910-0.940 g/cm$^3$ and are produced using a high pressure process via free radical polymerisation.

Another preferred embodiment uses polymer blends containing from 50 to 95 wt. % of ethylene based plastomer and 50 to 5 wt. % of metallocene linear low density polyethylene.

Core layer comprising polymer blends of propylene based elastomer and copolymer of propylene with ethylene and optionally butene (copolymer or terpolymer) having a melting point preferably lower than 145° C. provide easily orientable films. These copolymers have preferably a melting point of higher than 100° C., more preferably higher than 125° C. In an embodiment of such films to be preferably used in steam shrink tunnels, the polymer blends contain from 50 to 95 wt.

% of propylene based elastomers and 50 to 5 wt. % of copolymer of propylene with ethylene and optionally butene (copolymer or terpolymer) having a melting point preferably lower than 145° C. Polymer blends containing from 5 to 50 wt. % of propylene based elastomers and 50 to 95 wt. % of said copolymer or terpolymer are used more often in hot air shrink tunnels.

Copolymers of propylene with ethylene and optionally butene copolymer can be manufactured in any conventional manner using Ziegler-Natta or metallocene catalysts or any other suitable catalyst systems. Examples of suitable commercially available resins include: XPM-7794 and XPM-7510 both $C_2$-$C_3$-$C_4$ terpolymers available from Japan Polypropylene Corp; EP-8573 a $C_3$-$C_2$ copolymer available from Total Petrochemical Company; PB0300M and Adsyl 3C30FHP available from Basell. Copolymers of propylene with ethylene are preferably used.

The core layer may contain cyclic olefin copolymer (COC) as defined below. Films comprising a core layer having up to 30 wt. % of COC have improved stiffness. The core layer usually contains less than 20 wt. %, preferably from 5 to 10 wt. %, COC based on the wt. of the polymers present in the core layer. In some embodiments, the COC in the core layer may come from the recycling of the edge trims or reclaimed film.

It is contemplated that the core layer may comprise other polymer(s) such as PETG, PET, polylactic acid (PLA), PVC, polystyrene (PS) or combination thereof. However these polymers are usually excluded from the core layer of the films according to the disclosure.

The core layer may contain other additives such as inorganic fillers, pigments, antioxidants, acid scavengers, ultraviolet absorbers, processing aids such as zinc stearate, extrusion aids, slip additives, permeability modifiers, antistatic additives, cavitating agents such as calcium carbonate and β-nucleating agents. These additives may be introduced into the core layer in the form of master batch in a polyolefin, typically in low density polyethylene (LDPE).

The core layer will preferably comprise from 20 to 90%, more preferably from 30 to 90% still more preferably from 50 to 85% and even more preferably from 50 to 70 wt. % of the multilayer films of the present disclosure. For economical reasons, the core layer usually comprises from 70 to 85 wt. % of the multilayer films of the present invention.

Skin Layer

The multilayer film of the present disclosure also comprises at least one skin layer comprising preferably at least one cyclic olefin copolymer (COC). Preferably, the film comprises 2 skin layers, each comprising at least one COC.

The COC used in the present disclosure are random copolymers of ethylene or propylene and a cyclic olefin, such as, norbornene and/or its derivatives and tetracyclododecene and/or its derivatives. The glass transition temperature of the COC used according to the present disclosure is usually from 60° C. to 120° C., more preferably 70° C. to 80° C. to achieve low natural shrinkage. COC with lower glass transition temperature, for example with a glass transition temperature as low as 50° C., may be used for films which shrink at very low temperature but those films could have higher natural shrinkage and could require transportation and/or storage under controlled conditions. The material's volume flow rate (MVR) measured at 260° C. under 2.16 kg according to ISO 113 is preferably between 1 and 60 ml/10 min preferably between 20 and 50 ml/10 min. The density of the COC according to ISO 1183 is preferably in the range of from 1.00 to 1.06. The number average molecular wt. measured by GPC is typically from 1,000 to 1,000,000. COC useful according to the present disclosure include Topas® products available from Ticona and Zeonor® products available from Zeon Chemicals.

In an embodiment, the skin layer comprises at least 55 wt. %, preferably at least 70 wt. %, and most preferably, at least 90 wt. % of COC of the polymers present in the skin layer. In addition to the COC the skin layer(s) may also contain other film forming polymer resin(s) in a lesser amount, generally less than 45 wt. %. Amounts less than 30 wt. %, preferably less than 15 wt. % and more preferably less than 10 wt. % based on the other polymer resin(s) are suitable. Such polymeric resin(s) include propylene and ethylene homopolymers and copolymers and any combination thereof.

The use in the COC skin layer of polymer(s) with melting point lower than, or equal to, the stretching temperature, such as for example, the Exceed metallocene LLDPE or the Exact ethylene based plastomer, is preferred for the preparation of transparent films. The addition of material with higher melting point may be used when transparency is not an issue.

The skin layer(s) may also advantageously contain other additives such as pigment, antioxidants, acid scavengers, ultraviolet absorbers, processing aids such as zinc stearate, extrusion aids, antiblock, slip additives or antistatic additives.

The skin layers may comprise from 10 to 80 wt. %, preferably from 10 to 70 wt. % and more preferably from 15 to 50 wt. % and even more preferably from 30 to 50 wt. % of the multilayer films of the present disclosure. For economical reasons, the skin layer usually comprises from 30 to 15 wt. % of the multilayer films of the present invention.

The skin layers may be made of different polymer(s) or of the same polymer(s) in different or in the same ratio. More preferably the films according to the present disclosure have two skin layers of the same polymer configurations and polymer composition ratios.

The multilayer film of the disclosure may optionally comprise one or more tie layers. Tie layers can be beneficial in helping to ensure good adhesion between the skin layers and the core layer. The tie layer, if present, will preferably comprise from 5 wt. % to 15 wt. % of the entire multilayer film. Tie layers may also be used to increase the stiffness of the films to level required by the sleeve dispensing devices. The polymer to be used preferably for the tie layer(s) are alpha-olefin polymers having a melting point from 50 to 145° C. Their tensile modulus us usually higher than 20 MPa. Secant modulus is usually higher than 50 MPa. Materials suitable for these tie layers include 8573 commercialised by Total Petrochemical or JPP 7701, JPP 7510 and JPP 7790 commercialised by Japan Polypropylene Corporation.

In some embodiments, the multilayer films of the disclosure do not comprise tie layer(s).

The film has typically a thickness of from 5 to 300 µm, preferably from 10 to 150 µm. Films having a thickness of from 20 to 90 µm are particularly suitable according to the present disclosure.

The films of the present disclosure can be produced by any known method. The films may be obtained by extrusion or coextrusion through cast die or annular die. The films may be oriented in either the machine direction (MD), the transverse direction (TD) or in both directions.

In a preferred embodiment the films are preferentially oriented at least in the transverse direction. The following method may be used. Using a plurality of extruders, the resins are melted, coextruded from the T-die, solidified by cooling with a chilled roll, roll stretched in the MD if needed, tenter-stretched in the TD, heat set, cooled, optionally subjected to corona discharge treatment at least on one surface, and wound up with a winder, thus obtaining a film. While stretching in the MD does not seem essential according to that embodiment, some stretching in the MD direction is desirable to improve the easiness of splitting the film in the lateral direction. As the conditions for the MD stretching, the following ranges are preferable. The temperature is from 70 to 90° C., the stretching ratio is from 1.05 to 1.35, preferably 1.2 to 1.3, and the stretching time is more preferably as short as possible specifically below 0.3 second. The conditions for the TD stretching are preferably as follows. The temperature is in the range from 80 to 120° C., the stretching ratio is from 4 to 8. The films according to the disclosure may also be taken through secondary processes. This includes, corona and/or flame plasma treatments, metallization through vacuum metallization, printable topcoat applied as needed to enhance the decorative nature of the label, lamination or protecting coating such as lacquers.

In a preferred embodiment the multilayer film of the present disclosure consists in a three layers film mono-oriented in the transverse direction and comprising a core layer comprising at least 90 wt. % of a at least one alpha-olefin polymer selected from propylene based elastomers, ethylene plastomers and metallocene catalysed linear low density polyethylene, or preferably a blend of propylene based elastomer and copolymer of propylene ethylene and optionally butene as described above, and two skin layers comprising at least 90 wt. % of a COC having a glass transition temperature of from 70 to 80° C.

The multilayer heat shrink films of the present disclosure usually have a shrinkage of 30% or more, preferably 40% or more, more preferably 50% or more in the oriented direction when placed during 7 minutes in an oven at temperature of from 60° C. to 150° C., typically from 70° C. to 135° C. or during 10 seconds in water bath at temperature of from 60 to 100° C. Shrinkage is determined by measuring the difference of sample length before and after placing the sample, unrestrained, in an oven or in a water bath at the selected temperature (ASTM 1204). Shrinkage below 20% tends to undesirably limit the extent to which a film can conform to a container contour. While an upper limit on the extent of shrink is unknown, it will be preferably below 95%.

Clarity (especially contact clarity) and transparency are desirable in applications where a non-obscure view of the product around which the films label resides. High clarity and transparency are also desirable for "reverse" printing of labels where printing resides between the labels and the container and a consumer views the printing through the label.

Typically, films of the present disclosure have transparency values at a film thickness of 50 µm of 10 or more, preferably 15 or more, more preferably 20% or more. Transparency is determined according to ASTM method D-1746.

Haze values of the films according to the disclosure may range depending on the application. When the application requires high clarity and low haze, the haze value, determined according to ASTM method D-1003, at a film thickness of 50 µm is 20% or less, preferably less than 15%, more preferably 10% or less. Haze values lower than 5% are preferably obtained with films whose skin layers use polymer(s) with melting point lower than, or equal to, the stretching temperature.

The stiffness of the multilayer films of the present disclosure is measured by using a Handle O Meter according to the ASTM D2923-70 and is provided in g/15 mm. The stiffness in the orientation direction according to the disclosure is of at least 25 g/15 mm, preferably at least 30 g/15 mm. Values of between 35 and 45 are easily obtained. Accordingly the oriented films according to the disclosure can be used in sleeve labelling at high line speeds.

Tensile strength is measured according to ASTM D882 and is provided in $N/mm^2$.

The shrink tension of the present films is preferably lower than 10 $N/mm^2$, ideally lower than 5 $N/mm^2$, to avoid container deformation or sleeved label breakage during label shrinkage. The shrink tension is measured using a Retramat equipment. A Retramat equipment is equipped of a heated oven. The film sample is connected to a transducer capable of measuring a force. When the test starts, the heated oven moves to enclose the sample which starts to shrink. At the end of the test, the oven moves back to its original position. The transducer measures the shrink force as a function of time. The temperature around the sample is also recorded. The conditions for the test are: oven heated at 150° C., oven around the sample for 45 sec. It has been discovered that the presence of propylene-based elastomers, such as Vistamaxx, in the core layer lowers the shrink tension.

The film density as determined according to ASTM D1505 is preferably lower than 0.96 $g/cm^3$. Values lower than 0.96 $g/cm^3$ may be obtained according to the present disclosure and are useful for easy separation of PET bottles flakes from the labels during the recycling process.

The films according to the disclosure are useful in many shrink film applications for packaging articles including without limitations, batteries, aluminium can containers, aerosol cans, plastic liquid beverage containers, glass containers and irregular shaped containers.

The films of the present disclosure further have a particular utility as labels such as sleeve labels.

To convert a film of the present disclosure into a sleeve label, the stretched film is usually subjected to printing by a suitable method such as gravure or offset printing on the surface subjected to corona discharge treatment. To obtain a tubular label from the printed planar heat shrinkable film thus prepared, centre sealing is carried out with the use of an organic solvent as described from example in EP 1 632 343 and cut into appropriate lengths thereby obtaining labels as sleeve form. The organic solvent is not particularly limited insofar as it dissolves or swells the front back film layers of the film. Organic solvents comprising tetrahydrofuran (THF), cyclohexane or methyl ethyl ketone (MEK) are preferred and more preferably blends of these solvents.

Films and labels of the present disclosure can also advantageously possess perforations through the film or label. Perforations are most desirably carried out immediately before the sealing.

The benefits of the presence of COC in the skin layers enable the solvent seaming of the films. The films according to the disclosure have improved stiffness.

Finally it was surprising to discover that a relatively thin COC layer not only greatly increased the shrink percentage at low shrinkage temperature, but also decreased natural shrinkage during roll storage, which would create film's deformation and difficulties on printing.

The following examples serve as an illustration of the disclosure, the measured features and the units for their expressions are explained hereafter.

EXAMPLES

Examples 1 to 6

Multilayer cast films were prepared using multilayer cast film line. Each coextruded film had an A/B/A structure where the A layers were the skin layers comprising the COC and the B layer was the core layer.

The composition of the layers and properties of the oriented films are given in Table 1 below, wherein:

Topas® COC commercialized by Topas. Topas 8007 has a glass transition temperature of 78° C., Topas 9506 (used at Table 5) has a Tg of 65° C., EOD01-05 Metallocene random copolymer of propylene commercialized by Total Petrochemicals containing 4 wt. % ethylene, having a peak melting point at 122° C. and a melt flow index according to ASTM D1238, 230° C., 2.16 kg of 8 g/10 min, Exceed™ 1018 Metallocene LLDPE comprising hexene commercialized by ExxonMobil having a Melt Index according to ASTM 1238 (2.16 kg 190° C.) of 1.0 g/10 min, a peak melting point at 119° C., Vistamaxx™ Propylene based elastomer commercialized by ExxonMobil. Vistamaxx 3980 has a peak melting point at 77° C., Tospearl™ 145 4.5 μm spherical crosslinked silicone antiblock manufactured by Toshiba Silicone Co., Ltd.

Dimensional stability was measured a temperatures from 70 to 135° C. on films that had been placed during 7 min in a ventilated oven at the given temperature (ASTM D 1204) or 10 sec in a water bath at the given temperature (ASTM D2732).

Storage stability in the TD dimensional stability was measured on samples stored during 7 days in a ventilated oven at 50° C.

Weld strength was measured on an Instron™ tensile tester equipment. The samples to be tested were first welded by wiping a cotton strip dipped in solvent, folding the sample and applying pressure by rolling a 2 kg weigh roll. The weld strength was measured after 1 hour. Tetrahydrofurane (THF) was the most commonly used solvent for solvent seamed shrink films, and had been used in the tests to evaluate welding properties. Other solvents (dichloromethane, carbon tetrachloride) had been tested as well and gave good weld strength.

TABLE 1

|   | Example 1 | Example 2 | Example 3 | Example 4 | Example 5 | Example 6 |
|---|---|---|---|---|---|---|
| A | Topas ® 8007 + 1000 ppm Tospearl ™ 145 7 μm | Topas ® 8007 + 1000 ppm Tospearl ™ 145 7 μm | Topas ® 8007 + 1000 ppm Tospearl ™ 145 6 μm | Topas ® 8007 + 1000 ppm Tospearl ™ 145 6 μm | Topas ® 8007 + 1000 ppm Tospearl ™ 145 6 μm | Topas ® 8007 + 1000 ppm Tospearl ™ 145 6 μm |
| B | EOD01-05 | Exceed 1018 | Vistamaxx | Vistamaxx + 30 wt. % exceed | Exact 8201 + 10 wt. % LLDPE | Exact 3132 + 10 wt. % LLDPE |

The core layer had a thickness of about 32 to 39 μm. The average total film thickness before the orientation step was 100-500 μm.

The coextruded structures were cooled on a chilled roll, roll stretched in the MD, tenter stretched in the lateral direction. The MD stretching conditions comprised a temperature of 90-95° C. and a stretching ratio of about 1.25, the TD stretching conditions comprised a temperature of between 80° C. to 110° C. depending on the composition of the core and a stretching ratio of 4 to 8. The properties of these films are reported in Table 2.

TABLE 2

|   |   | Ex. 1 | Ex. 2 | Ex. 3 | Ex. 4 | Ex. 5 | Ex. 6 |
|---|---|---|---|---|---|---|---|
| Gauge μm |   | 48 | 46 | 51 | 50 | 48 | 52 |
| Haze % |   | 4.9 | 24 | 12 | 23 | 11 | 10.6 |
| Dim. Stab. TD (%) | 70° C. | −1 | −5 | 0 | 0 | 0 | −1 |
| (7 minutes in a | 80° C. | −9 | −11 | −5 | −5 | −6 | −2 |
| heated oven) | 90° C. | −15 | −15 | −56 | −53 | −64 | −7 |
|   | 100° C. | −24 | −24 | −78 | −78 | −77 | −28 |
|   | 110° C. | −42 | −42 | −81 | −81 | −81 | −78 |
|   | 120° C. | −66 | −62 | −81 | −81 | −82 | −79 |
|   | 135° C. | −74 | −76 | −81 | −80 | −84 | −81 |
| Dim. Stab. TD (%) | 70° C. | 0 | 0 | 0 | 0 | 0 | 0 |
| (7 minutes in a | 80° C. | −1 | 0 | 1 | 1.5 | 1 | 1 |
| heated oven) | 90° C. | −2 | 0 | 7 | 1 | 7 | 5 |
|   | 100° C. | −2 | 0 | −9 | −7 | −10 | 5 |
|   | 110° C. | −1 | −1 | 13 | −12 | −18 | −7 |
|   | 120° C. | 0 | 0 | 15 | −18 | −21 | −7 |
|   | 135° C. | −18 | −4 | 19 | −21 | −30 | −12 |
| MD Stiffness (g/15 cm) |   | 27 | 27 | 31 | 30 | 26 | 29 |
| TD Stiffness (g/15 cm) |   | 30 | 27 | 38 | 34 | 33 | 37 |
| Storage Stability (%) |   |   | −6.4 | −1.7 | −1.6 | −2.5 | −1.8 |
| Weld Strength (g/25 mm) |   | 8040 | 9000 | 2160 | 1875 | 1485 | 1765 |

Examples 7 and 8

These examples are given by comparison. Multilayer cast films were prepared as in examples 1 to 6.

The composition of the layers and properties of the films are as follows:

TABLE 3

|   | Example 7 | Example 8 |
|---|---|---|
| A | EOD01-05 | Exceed 1018 |
| B | EOD01-05 | Exceed 1018 |

The coextruded film had a thickness of about 50 μm, the average total film thickness before the orientation step is about 400 μm. The properties of these films were as follows:

TABLE 4

|   |   | Example 7 | Example 8 |
|---|---|---|---|
| Gauge μm |   | 52 | 50 |
| Haze % |   | 2.0 | 1.5 |
| Dim. Stab. TD (%) | 70° C. | −5 | −5 |
|   | 80° C. | −10 | −8 |
|   | 90° C. | −18 | −13 |
|   | 100° C. | −26 | −20 |
|   | 110° C. | −44 | −38 |
|   | 120° C. | −63 | −81 |
|   | 135° C. | −69 | −84 |
| Dim. Stab. TD (%) | 70° C. | −1 | 0 |
|   | 80° C. | −7 | 0 |
|   | 90° C. | −1 | 0 |
|   | 100° C. | −2 | 0 |
|   | 110° C. | −4 | 0 |
|   | 120° C. | −8 | −21 |
|   | 135° C. | −17 | −20 |

TABLE 4-continued

|  | Example 7 | Example 8 |
|---|---|---|
| MD Stiffness (g/15 cm) | 61 | 17 |
| TD Stiffness (g/15 cm) | 95 | 21 |
| Storage Stability (%) | −3.7 | −6.0 |
| Weld Strength (g/25 mm) | 0 | 0 |

With samples as Examples 1-6, tubes were welded on an automatic seaming machine Seam 300D-HS from Karlville using THF as solvent produced sleeves with destructive bonds when pulled apart.

Sleeves made of film as described in Examples 3-6 were cut into individual labels and applied around a bottle requiring 60% shrink showed perfect appearance after shrinkage in a steam tunnel.

Sleeves made of film as described in Examples 2, 4 and 5 were cut into individual labels and applied around a bottle with more than 50% shrink requirements showed perfect appearance after shrinkage in a hot air tunnel.

Sleeves made of films of example 1 did not give a sufficient shrink %.

Samples as described in examples 7 and 8 could not be welded to form a tube using THF as solvent.

Examples 9 to 11

The following multilayer films have been prepared and tested.

TABLE 5

|  |  | Example 9 | Example 10 | Example 11 |
|---|---|---|---|---|
| Skin | 5 μm | Topas 8007 | Topas 8007 | Topas 9506 |
| Core | 40 μm | Vistamax + Total 8375 80/20 wt. % | Vistamax + Total 8375 40/60 wt. % | Vistamax + Total 8375 80/20 wt. % |
| Skin: | 5 μm | Topas 8007 | Topas 8007 | Topas 9506 |
| Dim. Stab. | 70° C. | −1 | −2 | −21 |
| (in oven) | 80° C. | −27 | −12 | −32 |
| TD % | 90° C. | −47 | −25 | −51 |
|  | 100° C. | −59 | −40 | −65 |
|  | 110° C. | −68 | −53 | −68 |
|  | 120° C. | −77 | −63 | −79 |
|  | 135 ° C. | −80 | −76 | −82 |
| Dim. Stab | 70° C. | 0 | 0 | 5 |
| (in oven) | 80° C. | 8 | 2 | 7 |
| MD % | 90° C. | 16 | 2 | 10 |
|  | 100° C. | 17 | 2 | 8 |
|  | 110° C. | 12 | 2 | 5 |
|  | 120° C. | 2 | 1 | −4 |
|  | 135° C. | 7 | −13 | −17 |
| Dim. Stab | 70° C. | 0 | 0 | −10 |
| (in water) | 80° C. | −8 | −4 | −33 |
| TD % | 90° C. | −43 | −22 | −51 |
|  | 100° C. | −60 | −37 | −67 |
| Dim. Stab | 70° C. | 0 | 0 | 3 |
| (in water) | 80° C. | 3 | 1 | 8 |
| MD % | 90° C. | 13 | 2 | 10 |
|  | 100° C. | 13 | 2 | 7 |
| Shrink Force Retramat |  | 3.7N/mm$^2$ | 6N/mm$^2$ | 3.3N/mm$^2$ |

Wherein Total 8573 is a copolymer of propylene containing 3.5% ethylene and having a melting temperature of 135° C. commercialised by Total Petrochemicals. Film of Example 9 performs particularly well in shrink steam tunnel and does not need storage under controlled conditions, Film of Example 10 performs particularly well in shrink air tunnel and does not need storage under controlled conditions, Film of Example 11 performs particularly well in shrink steam tunnel. Having a high shrink at low temperature film of example 11 needs storage under controlled conditions (low temperature).

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A multilayer heat shrink film comprising:
    a) a core layer including at least,
        (i) from 60 to 98 wt. % of at least one polymer selected from propylene based elastomers, ethylene plastomers, metallocene catalysed linear low density polyethylenes, and blend thereof, and
        (ii) from 40 to 2 wt. % of at least one alpha-olefin polymer having a melting point higher than polymer (i); and
    b) at least one skin layer comprising a cyclic olefin copolymer (COC).

2. The film of claim 1, comprising two skin layers, each of the skin layers comprising a cyclic olefin copolymer.

3. The film of claim 1, wherein the alpha-olefin polymer has a peak melting point in the range of from 60° C. to 125° C.

4. The film of claim 1, wherein the core layer contains (i) from 50 to 95 wt. % of ethylene plastomer and 50 to 5 wt. % of metallocene linear low density polyethylene.

5. The films of claim 1, wherein the core layer contains 60 to 95 wt. % of propylene-based elastomers and 40 to 5 wt. % of copolymer of propylene with ethylene and optionally butene (copolymer or terpolymer) having a melting point lower than 145° C.

6. The films of claim 1, wherein the core layer contains 5 to 40 wt. % of propylene-based elastomers and 95 to 60 wt. % of copolymer of propylene with ethylene and optionally butene (copolymer or terpolymer) having a melting point lower than 145° C.

7. The films of claim 1, wherein the COC is selected from random copolymers of ethylene or propylene and a cyclic olefin comprising at least one of norbornene, norbornene derivatives, tetracyclododecene, or tetracyclododecene derivatives.

8. The film of claim 6, wherein the COC has a glass transition temperature of from 70 to 80° C.

9. The film of claim 1, wherein each skin layer comprises at least 50 wt. % of COC.

10. The film according to claim 1, consisting in a three layers film monoaxially oriented in the transverse direction and comprising a core layer comprising at least 90 wt. % of one or more alpha-olefin polymer selected from propylene based elastomers, metallocene catalysed copolymer of propylene and ethylene, ethylene plastomers and metallocene catalysed linear low density polyethylene, and two skin layers comprising at least 90 wt. % of a COC having a glass transition temperature of from 70 to 80° C.

11. Label comprising a film according to claim 1.

12. The label of claim 11, wherein the shrink label is a sleeve label.

13. Article comprising a film according to claim 1.

14. The article claim 1, wherein the article comprises a label or flexible packaging.

15. A multilayer heat shrink film comprising:
a) a core layer including at least,
   (i) from 50 to 98 wt. % of at least one polymer selected from propylene based elastomers, ethylene plastomers, and blend thereof, and
   (ii) from 50 to 2 wt. % of at least one alpha-olefin polymer having a melting point higher than polymer (i); and
b) at least one skin layer comprising a cyclic olefin copolymer (COC).

* * * * *